(12) United States Patent
Smit

(10) Patent No.: US 10,416,757 B2
(45) Date of Patent: Sep. 17, 2019

(54) TELEPRESENCE SYSTEM

(71) Applicant: Raymond Maurice Smit, Waalre (NL)

(72) Inventor: Raymond Maurice Smit, Waalre (NL)

(*) Notice: Subject to any disclaimer, the term of this patent is extended or adjusted under 35 U.S.C. 154(b) by 0 days.

(21) Appl. No.: 15/373,351

(22) Filed: Dec. 8, 2016

(65) Prior Publication Data

US 2018/0164876 A1    Jun. 14, 2018

(51) Int. Cl.

| | | |
|---|---|---|
| G06F 3/01 | (2006.01) | |
| G06T 7/70 | (2017.01) | |
| G06F 3/03 | (2006.01) | |
| G06F 3/0346 | (2013.01) | |
| G06T 7/60 | (2017.01) | |
| G06T 19/00 | (2011.01) | |
| H04N 5/232 | (2006.01) | |
| H04N 13/366 | (2018.01) | |
| H04N 5/247 | (2006.01) | |
| H04N 13/243 | (2018.01) | |
| H04N 13/344 | (2018.01) | |
| H04N 13/296 | (2018.01) | |
| H04N 13/398 | (2018.01) | |

(Continued)

(52) U.S. Cl.
CPC .............. *G06F 3/012* (2013.01); *G06F 3/011* (2013.01); *G06F 3/0304* (2013.01); *G06F 3/0346* (2013.01); *G06F 3/04815* (2013.01); *G06T 7/60* (2013.01); *G06T 7/70* (2017.01); *G06T 19/006* (2013.01); *H04N 5/23293* (2013.01); *H04N 5/23296* (2013.01); *H04N 5/247* (2013.01); *H04N 13/243* (2018.05); *H04N 13/296* (2018.05); *H04N 13/344* (2018.05); *H04N 13/366* (2018.05); *H04N 13/398* (2018.05); *G06F 2203/04806* (2013.01); *G06T 2200/04* (2013.01); *G06T 2207/30244* (2013.01); *G06T 2215/16* (2013.01); *H04N 13/383* (2018.05)

(58) Field of Classification Search
None
See application file for complete search history.

(56) References Cited

U.S. PATENT DOCUMENTS

| | | | |
|---|---|---|---|
| 2004/0169676 A1* | 9/2004 | Williams | ................ G06T 15/20 |
| | | | 715/716 |
| 2007/0022455 A1* | 1/2007 | Endou | .................... H04N 7/181 |
| | | | 725/105 |

(Continued)

*Primary Examiner* — Yanna Wu

(74) *Attorney, Agent, or Firm* — Eric Kelly

(57) ABSTRACT

The invention relates to a telepresence system comprising a plurality of cameras, a head mounted display device, a processing system and a first orientation sensor, wherein the cameras are positioned at different viewpoints that are aligned so that each camera's field of view at least partly overlaps with those of an adjacent camera, wherein the processing system is arranged to receive image data from each one of the plurality of cameras, to receive orientation information from the orientation sensor, to select one or two cameras, the selection of the one or two cameras depending on the received orientation information, to send image data received from currently selected cameras to the head mounted display device, and if newly received orientation information indicates an orientation change across a predefined threshold, switch from the currently selected cameras to one or two newly selected cameras located at other viewpoints.

23 Claims, 4 Drawing Sheets

(51) Int. Cl.
*G06F 3/0481* (2013.01)
*H04N 13/383* (2018.01)

(56) References Cited

U.S. PATENT DOCUMENTS

| | | | |
|---|---|---|---|
| 2008/0178232 A1* | 7/2008 | Velusamy | H04N 5/23203 |
| | | | 725/88 |
| 2010/0040292 A1* | 2/2010 | Clarkson | G06F 3/017 |
| | | | 382/201 |
| 2014/0023995 A1* | 1/2014 | Jones | G09B 9/003 |
| | | | 434/11 |
| 2014/0085203 A1* | 3/2014 | Kobayashi | G01S 19/14 |
| | | | 345/158 |
| 2016/0227190 A1* | 8/2016 | Cole | H04N 13/0055 |

* cited by examiner

TELEPRESENCE SYSTEM

FIELD OF THE INVENTION

The invention relates to a telepresence system and to a method of image processing. The invention also relates to a virtual reality system and to a method of displaying a 3D virtual world on a head mounted display device.

BACKGROUND ART

Among many people there is a longstanding desire to experience real world physical environments or spaces at a remote location. This remote experiencing has been tried to accomplish using, over time, celluloid movies, black and white television, color television, 3D television and, more recently, Head Mounted Displays (HMDs) such as those used frequently in Virtual Reality (VR), Augmented Reality (AR) and Mixed Reality (MR) applications.

The problem with all these technologies lies in the fact that the viewer does not feel like she is present at the remote location because she is distracted by her own real environment around her, or her feeling of presence is broken when she moves or needs to control the system. Even with stereoscopic panoramic solutions the user is very limited in experiencing a remote location because she can only look around herself and she cannot look at the remote environment from a different angle without breaking immersion.

Patent publication U.S. Pat. No. 6,522,325 B1 describes a telepresence system that uses modular interlocking arrays of micro cameras. The cameras are on rails, with each rail holding a plurality of cameras. These cameras, each locked in a fixed relation to every adjacent camera on the array and dispersed dimensionally in a given environment, transmit image output to an associated storage node, thereby enabling remote viewers to navigate through such environment with the same moving light reflections and shadows that characterize an actual in-environment transit. The outputs of these micro cameras may be sent to viewers at remote terminals, interactive wall screens, or mobile image appliances. Each remote viewer, through a graphical user interface (GUI), can navigate through the environment, enabling seamless movement through the event.

SUMMARY OF THE INVENTION

Drawback of the known art is that a graphical user interface or other navigation means, such as a keyboard or joystick, is needed for the user to change cameras and move around in the remote world.

One of the objects of the invention is to provide a telepresence system that gives a user a more realistic experience.

A first aspect of the invention provides a telepresence system comprising a plurality of cameras, a head mounted display device, a processing system and a first orientation sensor, wherein the cameras are positioned at different viewpoints that are aligned so that each camera's field of view at least partly overlaps with those of an adjacent camera. The processing system is arranged to:
  receive image data from each one of the plurality of cameras;
  receive orientation information from the first orientation sensor;
  select one or two cameras, the selection of the one or two cameras depending on the received orientation information;
  send image data received from currently selected cameras to the head mounted display device, and
  if newly received orientation information indicates an orientation change across a predetermined threshold, switch from the currently selected cameras to one or two newly selected cameras located at other viewpoints.

It is noted that since the changing of the orientation will happen in a continuous manner, a minimal amount of change is needed before other cameras are selected. The threshold mentioned may depend on the number of cameras installed, or on the distance between the viewpoints at which the cameras are installed, or on both.

A telepresence system in accordance with the first aspect of the invention enables to user to see a remote world, and move around by simply rotating his head or body. So the user does not need to operate any user interface. It really feels like he is in the other world and is not busy with operating any navigation tool.

Optionally, the first orientation sensor is separate from the head mounted display device. The first orientation sensor may be arranged in a wearable device not being the head mounted device. If the wearable device is on the body it will rotate together with the body. In this case the user is able to move through the remote world by simply rotating his body. The user does not need to walk and can sit on e.g. a swivel chair. By turning on the swivel chair, the sensor detects a change in orientation, and this change in orientation is used by the processing system to select other cameras. The user will then see a scene in the remote world from a different perspective, and in case the cameras are aligned in an array, he will experience a natural movement through the remote world.

Optionally, the cameras are substantially arranged in a horizontal plane and wherein the processing system is arranged to detect a rotation of the first orientation sensor around a y-axis perpendicular to the horizontal plane, and when, seen from above,
  a clockwise rotation of the first orientation sensor is detected, the processing system will switch to the newly selected cameras, the newly selected camera being located, when facing the field of view of the currently used cameras to the right of the currently selected cameras,
  a counter clockwise rotation of the first orientation sensor is detected, the processing system will switch to the newly selected cameras, the newly selected cameras being located, when facing the field of view of the currently selected cameras to the left of the currently selected cameras.

In this case, if the user rotates to the left (counter clockwise), his point of view will move to the left in the remote world. The user is able to control his point of view in the remote world by rotating a certain degree thereby moving along a trajectory defined by the positions of the cameras. It is noted that in another embodiment, the movement through the remote world is opposite of the movement described above.

Optionally, neighbouring cameras have parallel or converging optical axes. This means that within an array of cameras, two neighbouring cameras are focusing on one area. It is noted that alternatives exist, wherein neighbouring camera have diverging optical axis. Also it is possible that the cameras are installed along a meandering trajectory where some neigbours have converging optical axes, and others have diverging or parallel optical axes.

Optionally, the plurality of cameras is arranged in an array following a curved or angular trajectory. The curved or angular trajectory may be a closed loop, wherein the fields of view of the cameras are directed inward. This configuration enables a viewing of an area very suitable for watching events taking place in an arena. It is noted that the word arena needs to be interpreted very broadly and that in this context it relates to any area in which an event, such as a sports event, can take place.

Optionally, the plurality of cameras is arranged in at least two arrays each array following a curved or angular trajectory. The two arrays can be arranged on different heights so that a viewer can switch from one level (i.e. height) to another. The plurality of cameras may be substantially arranged on an imaginary sphere. This kind of configuration enables moving around a scene in three dimensions. Depending on the configuration, a user can move his viewpoint from left to right in a horizontal plane and up and down in a vertical plane, by rotating his body and/or head.

Optionally, the processing system is arranged to send image data received from two neighbouring cameras to the head mounted display device, wherein image data received from a first of the neighbouring camera is displayed on a first display or display part of the head mounted display device, and image data received from a second of the neighbouring camera is displayed on a second display or display part of the head mounted display device. This will produce a stereoscopic view using only simple non-stereoscopic cameras.

Optionally, the processing system is arranged to receive a zoom in command, and on receiving the zoom in command switch from the currently selected cameras to two newly selected cameras that are further removed from a perpendicular line of the currently selected cameras than the currently selected cameras. The processing system may be arranged to detect a rotation of the first orientation sensor around a horizontal axis, and interpret a detected rotation as a zoom in or zoom out command. In this way, the zoom in command may be generated by detecting a rotation around the horizontal axis of the orientation sensor which may be arranged on the user's torso or head. For example by bending forward, the user may give the instruction to zoom in, while bending back may result in a zooming out.

Optionally, the telepresence system comprises a second orientation sensor arranged in or on the head mounted display device, or on the user's head, wherein the processing system is arranged to select a part of the field of view of the currently used camera or cameras, depending on orientation information received from the second orientation sensor.

Optionally, the selection of the one or two cameras depends on the received orientation information whereby a specific orientation always selects the same camera or cameras.

Optionally, a distance between two cameras is at least 1 meter.

A second aspect of the invention provides a method of image processing, the method comprising:
receiving image data from each one of a plurality of cameras, wherein the cameras are positioned at different viewpoints that are aligned so that each camera's field of view at least partly overlaps with those of an adjacent camera;
receiving orientation information from an orientation sensor;
selecting one or two cameras, the selection of the one or two cameras depending on the received orientation information;
sending image data received from currently selected cameras to a head mounted display device, and
if the received orientation information changes, switching from the currently selected cameras to one or two newly selected cameras.

Optionally, the selection of the one or two cameras depends on the received orientation information whereby a specific orientation always selects the same camera or cameras.

A third aspect of the invention provides a virtual reality system comprising a plurality of viewpoints in a virtual world, a head mounted display device, a processing system and an orientation sensor, wherein the plurality of viewpoints are aligned so that each viewpoint's field of view at least partly overlaps with those of an adjacent viewpoint. The processing system is arranged to:
display a 3D virtual world onto the head mounted display device;
receive orientation information from the orientation sensor;
select a point of view in the 3D virtual world, the selection of the point of view depending on the received orientation information;
display the 3D virtual world as seen from the currently selected point of view onto the head mounted display device, and
if the received orientation information changes, switch from the currently selected point of view to another newly selected point of view.

Optionally, the processing system is arranged to move the point of view through the 3D virtual world depending on a change in the received orientation information. The orientation sensor may be separate from the head mounted display device and arranged e.g. in a necklace or on another wearable device. This enables a control of the viewpoint by rotating the body if the sensor is attached to the body. An independent rotation of the head will not trigger a movement of the viewpoint, but may change the viewing direction.

Optionally, the processing system is arranged to move the point of view to the right if a clockwise rotation of the orientation sensor, when seen from above, is detected and move the point of view to the left if a counter clockwise rotation of the orientation sensor is detected. In this way the user can virtually move around through the 3D virtual world by rotating his body. The user does not need to walk and does not need to use any user interface. He can simply sit on e.g. a swivel chair and rotate his body. Within a few minutes, this will feel very natural to the user.

Optionally, the virtual reality system further comprises a second orientation sensor arranged in the head mounted display. The second sensor may alternatively be arranged on user's head during use. The processing system may be arranged to determine the viewing angle from the currently selected point of view based on the orientation information of the second orientation sensor.

Optionally, the processing system is arranged to receive a zoom in command, and on receiving the zoom in command to move the point of view through the 3D virtual world in the direction user's torso is facing as determined by the first orientation sensor.

Optionally, the processing system is arranged to detect a rotation of the first orientation sensor around a horizontal axis, and interpret a detected rotation as a zoom in or zoom out command.

Optionally, the selection of the point of view depends on the received orientation information whereby a specific orientation always selects the same point of view.

A fourth aspect of the invention provides a method of displaying a 3D virtual world on a head mounted display device, the method comprising:

rendering left eye and right eye images of the virtual world as seen from a plurality of viewpoints in the virtual world, wherein the plurality of viewpoints are aligned so that each viewpoint's field of view at least partly overlaps with those of an adjacent viewpoint;

receiving orientation information from a first orientation sensor;

selecting a point of view in the 3D virtual world, the selection of the point of view depending on the received orientation information;

displaying the 3D virtual world as seen from the currently selected point of view onto the head mounted display device, and if the received orientation information changes, switch from the currently selected point of view to another newly selected point of view.

Optionally, the selection of the point of view depends on the received orientation information whereby a specific orientation always selects the same point of view.

BRIEF DESCRIPTION OF THE DRAWINGS

These and other aspects of the invention are apparent from and will be elucidated with reference to the embodiments described hereinafter. In the drawings, FIGS. 1 and 2 schematically show a top view of parts of a telepresence system according to an embodiment.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
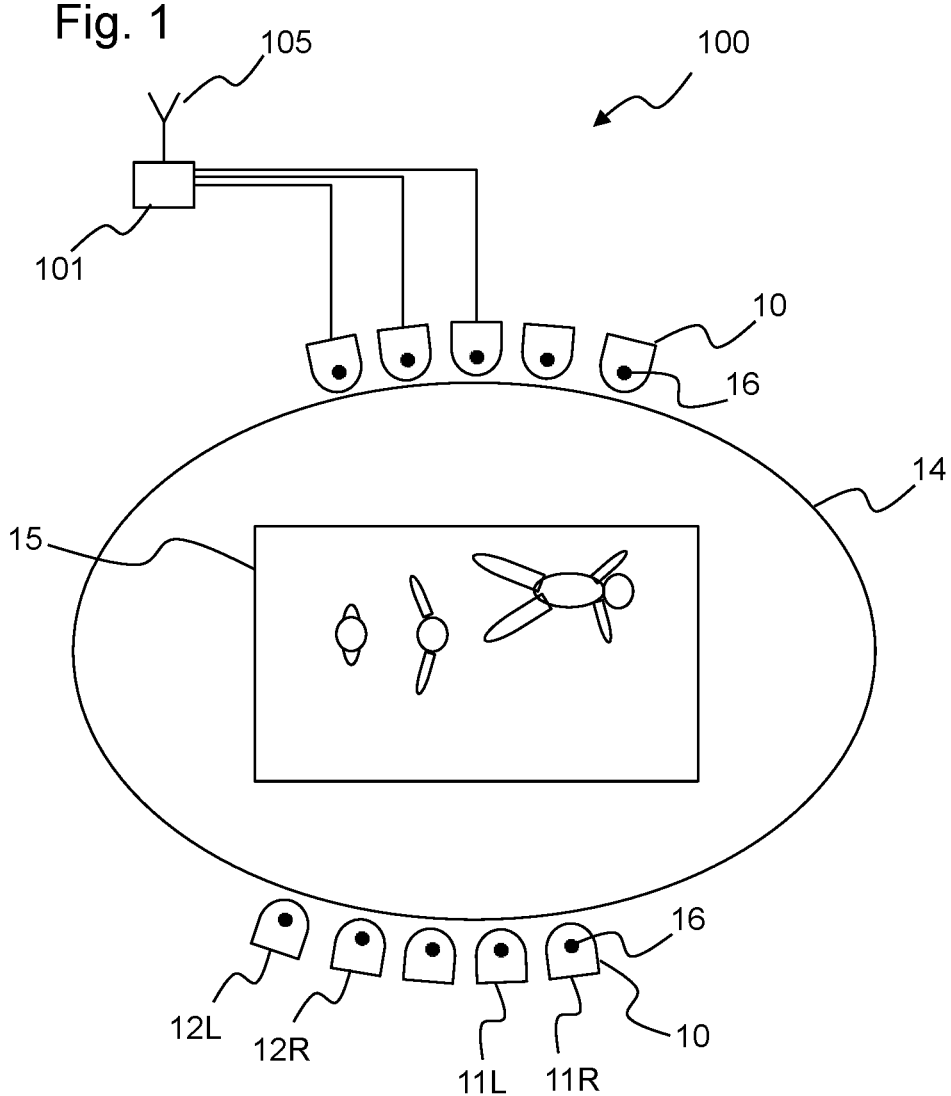
Figure 3:
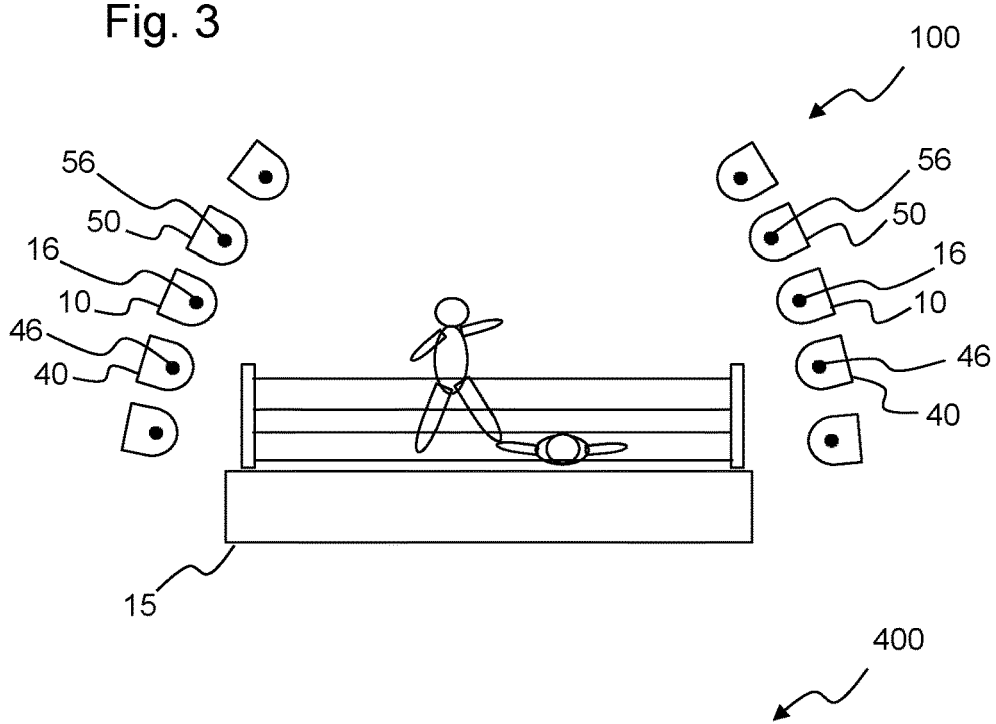
FIG. 3 schematically shows a side view of the scene of FIG. 1 with part of the telepresence system according to a further embodiment
Figure 5:
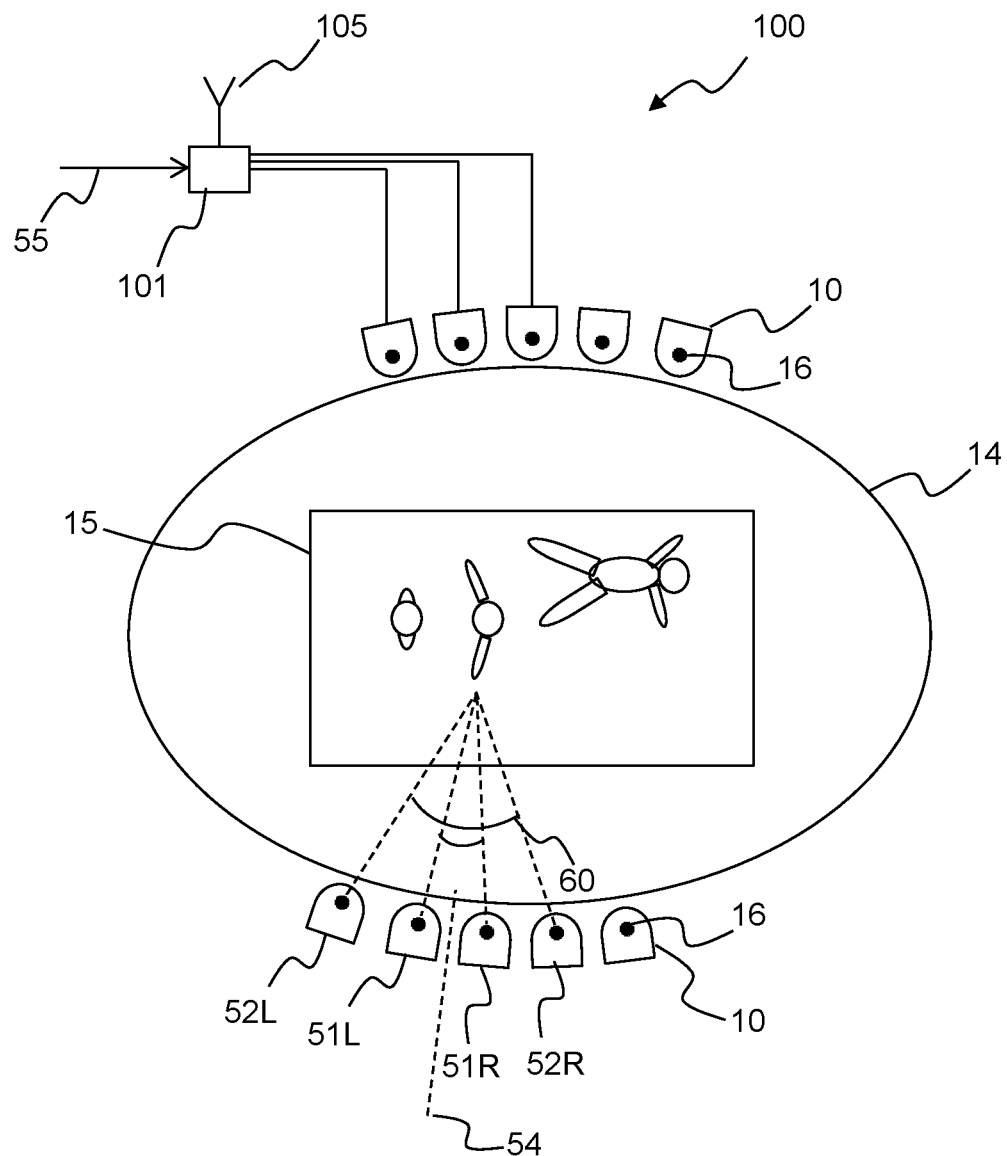
FIG. 5 shows an example wherein the processing system receives a zoom-in command.

FIGS. 1, 3 and 5 show cameras 10 positioned at viewpoints 16. A viewpoint, or point of view, is the position from which something or someone is observed. In this telepresence system cameras 10 at viewpoints 16 are aimed at one or more objects of interest, which can be, but are not limited to, people, animals and inanimate objects. When we mention the viewpoint 16 of a camera 10, we mean the location from which the objects of interest are apparently observed when watching the camera images using a head mounted display. It is noted that, in our definition of viewpoint, when a human observer turns his head while the rest of his body stays in the same position, the positions of his retinas and the actual focal points of his eyes change, but his viewpoint stays in the same place as he still observes the world from the same position in the world.

Figure 2:
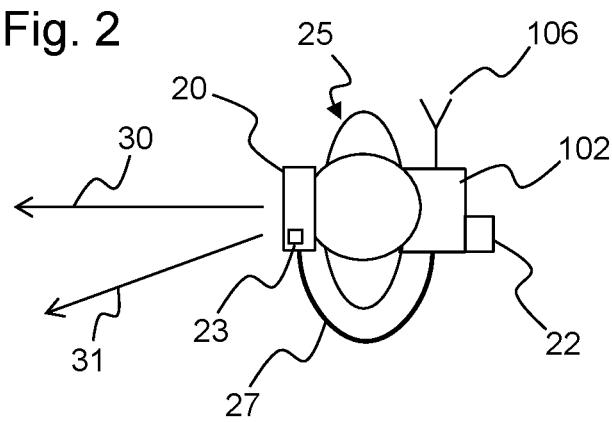

FIGS. 1 and 2 schematically show a top view of parts of a telepresence system according to an embodiment. The telepresence system 100 comprises a plurality of cameras 10 positioned at viewpoints 16, a head mounted display device (HMD) 20, a processing system 101, 102 and a first orientation sensor 22, also referred to as the main orientation sensor 22.

FIG. 1 shows an example of the plurality of cameras 10 which are positioned at viewpoints 16 along an ellipse 14 surrounding an arena 15. In this example the arena 15 is a boxing ring 15 in which a box fight takes place. The cameras 10 at viewpoints 16 are aligned so that each camera's field of view at least partly overlaps with those of an adjacent camera. In fact in this example the cameras 10 at viewpoints 16 are arranged in an array along a curved trajectory being the ellipse 14 or part of the ellipse 14. In FIG. 1 all along the ellipse 14 cameras are arranged but in FIG. 1 not all of them are visible. The optical axes of the cameras 10 at viewpoints 16 are converging so that the field of view of the cameras 10 at viewpoints 16 is directed inward to one specific area, i.e. towards an interior of the ellipse 14. It is noted that the array of cameras 10 at viewpoints 16 can be arranged close to the arena 15, but alternatively, the viewpoints 16 may be arranged more distant from the arena 15, for example behind a stand for the public (not shown).

In this example the processing system 101,102 is a distributed system comprising a first computing device 101 and second computing device 102, see FIG. 2, remote from the first computing device 101. The first and second computing device may communicate with each other via a WAN or a LAN which may be at least partly wireless, or any other type of communication suitable for transmitting image data, preferably real time. For the wireless (parts of the) connection, the computing devices 101, 102 may comprise antennas 105, 106 respectively.

The first computing device 101 may be located at or near the location of arena 15 while the second computing device 102 may be located near a user 25, at least in use, wearing the HMD 20. In this example, the HMD 20 is connected to the second computing device 102 via cable 27. It is noted that instead of a cable 27, the communication between the second computing device 102 and the HMD 20 can be wireless. The second computing device 102 may be mounted on the back of the user 25 to prevent problems with the cable 27 if present. Alternatively, the second computing device 102 may be mounted on or inside the HMD 20, or worn on user's body.

FIG. 2 also shows an optional second orientation sensor 23 which is arranged in or on the HMD 20. In the configuration of FIG. 2, the main orientation sensor 22 measures the orientation of the torso of the user 25 while the second orientation sensor 23 measures the orientation of the head of the user 25. The main orientation sensor 22 is mounted on the computing device 102, but it is noted that the main orientation sensor 22 may be arranged somewhere else, as long as it is able to measure the direction of the torso of the user 25. The main orientation sensor 22 may for example be fixed to a swivel chair on which the user is sitting. The main orientation sensor 22 may alternatively be arranged in a necklace or belt worn by the user 25.

An arrow 30 in FIG. 2 indicates the direction in which the user 20 is currently looking. A further arrow 31 indicates a new direction into which the user may rotate his torso.

The processing system 101,102 is arranged to receive image data from each one of the plurality of cameras 10 at viewpoints 16 and to receive orientation information from the main orientation sensor 22. The processing system will select one or two cameras, for example cameras 11L and 11R. In an embodiment the image recorded by the camera 11L will be displayed on a left screen of the HMD 20 while the image recorded by the camera 11R will be displayed on a right screen of the HMD 20. In this way a stereoscopic view can be realized, giving the user 25 a real feeling of presence. It is noted that alternatively the cameras 10 at viewpoints 16 can all be stereoscopic cameras in which case only one camera at a time is needed for displaying the scene in a 3D manner.

At a certain moment in time, if the received orientation information changes, the processing system will switch from the currently selected cameras 11L and 11R to one or two newly selected cameras, such as camera 12L and 12R. This will give the user the feeling that she is in fact moving the viewed space. So by rotating the torso, the user is able to rotate the arena 15.

The computing device 102 may receive the images from the computing device 101 in real time, or it may have all images already available locally, e.g. on memory card, data disc such as DVD, hard drive, etc. If viewing the remote location 'real time' (or with a short delay) and if network latency is low enough, then the computing device 102 does not need to receive all images from all cameras from the computing device 101, but can request only the images that it will show the user 25. In the example the user is sitting on a swivel chair (not shown). In FIG. 2 the user's body (torso) is oriented in its starting position and the user sees images from cameras 11L and 11R. The orientation of user's torso, relative to the world, is measured with sensor 22. The sensor 22 may be a wireless or wired sensor and can, in an embodiment, be worn on the user's body as a necklace, put in his pocket or mounted in or on the swivel chair or to the computing device 102 as shown in FIG. 2.

In the embodiment of FIG. 2, the orientation of the torso directly determines what cameras are used to show images from. When the user rotates his torso from direction 30 to direction 31, the processing system will switch from camera 11L, 11R to cameras 12L, 12R. When the user rotates his torso very fast and to a considerable degree, for example from a +90° orientation to a −90° orientation (so he's turning half a circle) within 0.25 second, preferably not all images from all cameras in between are shown since nor the HMD 20 nor the user 25 will be able to process that fast. In an embodiment, when the HMD screens are ready to show a next frame, at that moment it is decided/calculated what cameras to use images from.

If the cameras 10 at viewpoints 16 are equipped with wide angle lenses not the whole camera image is shown to the user, only the part that the HMD 20 is capable of showing in a convenient manner for the user needs to be processed. E.g. if user's head is oriented in the same direction as his body (i.e. he is looking straight ahead) and the cameras have 180° (fish-eye) lenses and the HMD 20 has a 90° field of view per eye, then only the center 90° of the registered image may be shown. So for example 45° of the left side of the camera image and 45° of the right side of the camera image are not shown on the HMD screens.

In an embodiment, the orientation of user's head is measured with a second orientation sensor 23. The second orientation sensor may be a wireless or wired sensor which can be, in an embodiment, incorporated in the HMD 20 or it can be a separate device, as long as it measures the orientation of user's head. It can measure the head orientation relative to the orientation of user's torso, or it can measure the head orientation relative to the world. In the latter case, the head orientation with respect to the torso can be calculated from the values of sensors 22 and 23. When the user is looking straight ahead, i.e. his head is turned in the same direction as his torso, the HMD 20 shows the images as described above. When the user turns his head a few degrees to the left, but keeps his body in the same position, a part of the left side of the (wide angle lens) camera images is shown. In this way the user is able to look around from a stationary location which will feel natural to the user. So a system with two orientation sensors (i.e. sensor 22 and 23) enables the user to view the remote location from any side of the environment by turning his torso in the direction he wants and furthermore allows him to view a little around him, from the chosen viewpoint, by turning his head.

The telepresence system described above enables the user to really experience the remote location as if he is present at that location because he can totally forget about controlling his viewing system. Moving your body to view the world is very natural. With this system, when you turn your torso, you see the world turn in front of you. Tests have shown that after a short while of using it, it feels very natural. It allows the viewer to experience e.g. a sports match as if he is walking on the sidelines.

To achieve a more fluent user experience when rotating the torso (or chair or head, depending on where the main orientation sensor 22 is mounted) a relatively high number of cameras and viewpoints is preferred. In fact, the more cameras in the array, the better the experience would become, still also depending on the quality of the image processing. It is noted that in practice physical (and financial) restraints will limit the number of cameras in an actually built system. It would be preferred to have an infinite number of cameras and viewpoints or one camera where the light sensitive sensor is a ring around the environment.

The cameras 10 at viewpoints 16 provide images that the viewer 25 watches using the HMD 20. When a low number of cameras is used, e.g. 4 cameras around a scene, the cameras 10 at viewpoints 16 may be stereoscopic/3D cameras that provide a left and right image for the left and right screen in the HMD 20. With a sufficiently high number of cameras, e.g. 40 cameras around a scene, the images from two adjacent cameras can be used to display as left and right image on the screens of the HMD 20. If the HMD 20 comprises only a single screen and two lenses for each eye, the image for the left eye can be placed on the left half of that screen, as is common practice with Virtual Reality (VR), Augmented Reality (AR) and Mixed Reality (MR) head mounted displays.

The cameras 10 at viewpoints 16 may have wide angle lenses where the horizontal and vertical angle of the recorded scene is wider than the field of view in the HMD 20. The camera angles may even be wider than the human field of vision. The camera angles may even be 360°. A 360° camera usually consists of two or more cameras with a smaller lens angle connected together, whereby the images of those cameras are stitched together to create a panoramic image.

In an embodiment, the processing system 101, 102 is arranged to record the images from all cameras for later use, or, in case of live viewing, to directly transmit the images to the HMD 20. The recorded images may be stored in a memory of the computing device 101 or of the computing device 102, or in an external memory such as an SDCard connectable to the telepresence system 100.

FIG. 3 schematically shows a side view of the scene of FIG. 1 with part of the telepresence system 100 according to a further embodiment. The telepresence system 100 comprises a first array of cameras 10 at viewpoints 16 arranged along an ellipse, which may be lying in a horizontal plane as was described with reference to FIG. 1. Furthermore, the system 100 comprises a second array 40 and a third array 50 of cameras at viewpoints 46 and 56, and possibly more arrays, each array following a curved trajectory lying in different planes. In an embodiment, the system 100 comprises a plurality of cameras arranged in at least two arrays wherein the plurality of cameras are substantially arranged on a virtual sphere. By arranging a plurality of cameras on at least part of a sphere, a scene can be viewed from different elevation points.

In an embodiment, the processing system will be arranged to switch to the newly selected cameras depending on a detected change of orientation in two dimensions. So for example the change of cameras is performed in both a horizontal and vertical orientation/rotation.

In a specific embodiment, if the user turns his head up, a part of the (wide angle lens) camera image is shown corresponding to the angle that he's looking up. If the torso (and thus sensor 22) is rotated up or down, camera images will be used from cameras in a plane above or below a currently used plane (e.g. from array of cameras 10 at viewpoints 16 to the array of cameras 40 at viewpoints 46).

In an embodiment, no torso sensor 22 is available but only a sensor in the HMD 20 or on user's head (sensor 23). In this case the sensor 23 may be used to select specific cameras corresponding with the orientation of the sensor 23. In this case it will not be possible to look at other parts of the images from wide angle cameras by slightly turning the head to the left or right.

In a further embodiment, wherein the sensor 23 is used to select specific cameras, changing the vertical head orientation does not provide another part of the (wide angle lens) camera image, but changes the plane of cameras that is used to show images from. So for example, if the user slightly turns his head up, the view will switch from one of the cameras 10 at viewpoints 16 to one of the cameras 50 at viewpoints 56. Alternatives are possible wherein, if the user slightly turns his head up, the view will switch from one of the cameras 10 at viewpoints 16 to one of the cameras 40 at viewpoints 46, so to a lower array of cameras.

In an embodiment, a third rotation angle is used to move the viewpoint of the user 25, wherein an axis of rotation goes from the back of the head of the user 25 through the nose. In the embodiments with the cameras arranged on at least part of an imaginary sphere around the scene of interest, this third rotation angle can be used to select two neighbouring cameras but from different horizontal planes/arrays. This allows the user to tilt his head to the side while looking at the scene and still see a good stereoscopic image using non-stereoscopic cameras.

Figure 4:
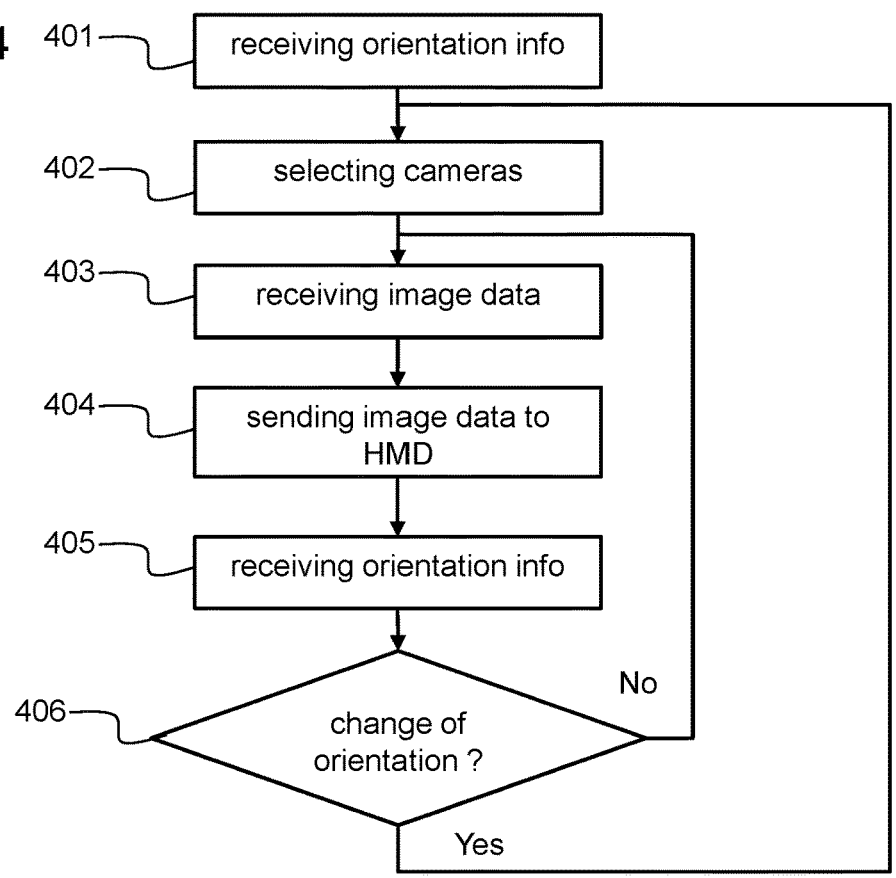
FIG. 4 shows flow chart of a method of image processing according to an embodiment of the invention.

FIG. 4 shows a flow chart of a method of image processing according to an embodiment of the invention. The method 400 comprises receiving 401 orientation information from the first orientation sensor 22. Also the method 400 comprises selecting 402 one or two cameras, the selection of the one or two cameras depending on the received orientation information. In a further operation 403 image data is received from the selected cameras. The cameras are positioned at different viewpoints that are aligned so that each camera's field of view at least partly overlaps with those of an adjacent camera. In a further operation, the method 400 comprises sending 404 image data received from currently selected cameras to a head mounted display device. In an operation 405 orientation information is received once more. If in test 406 it is noted that the received orientation information has changed, the method returns to operation 402 to select other cameras at other viewpoints. If in the test 406 it is concluded that the orientation is not changed, the method returns to operation 403.

As mentioned above, the processing system may be arranged to send image data received from two neighbouring cameras to the head mounted display device, wherein image data received from a first of the neighbouring camera is displayed on a first display or display part of the head mounted display device, and image data received from a second of the neighbouring camera is displayed on a second display or display part of the head mounted display device. In this way a stereoscopic view can be realized using two non-stereoscopic cameras. In a specific embodiment, the processing system is arranged to receive a zoom-in command as will be explained below in more detail.

It is noted that the described telepresence system also works with a small number of stereoscopic cameras as well. The only difference is that, for example when using 4 cameras, the user must turn his torso further before images from another (stereoscopic) camera are used to show to him. But he can still watch a football match from all sides of the field and feel present at that match.

In case the user wants to be able to view a scene from all sides, the cameras 10 at viewpoints 16 do not have to be arranged in a circle or ellipse. Arrangements in a square, a rectangle or another closed form work as well.

Depending on the application, the objects and environment (i.e. the scene) can be recorded for viewing at a later time, or transmitted electronically for viewing live at a remote location.

FIG. 5 shows an example wherein the processing system 101 receives a zoom-in command 55 and on receiving the zoom-in command 55 switches from two currently selected cameras 51L,51R to two newly selected cameras 52L,52R that are further removed from a perpendicular line 54 (also referred to as center line 54) of the currently selected cameras than the currently selected cameras 51L,51R. As a result, an angle 60 between lines from the newly selected cameras 52L,52R towards a specific point in the scene is larger than an angle between lines from the currently selected cameras 51L,51R. By switching to the cameras 52L,52R the viewer will experience a 3D zoom-in effect. The cameras 52L, 52R take the function of the two eyes of the user, when coming closer to a scene. The closer a person comes to a scene (i.e. zooms in) the greater the angle 60 between two selected cameras. Together with increasing the angle 60, the individual images registered by the cameras 52L, 52R may be processed so as to enlarge the captured images. This will result in a natural stereoscopic zooming experience.

So advantageously, the array of cameras 10 at viewpoints 16 can be used to turn the remote world around, as well as to zoom-in on the remote world. The zoom-in command 55 may be initiated by the user 25, see FIG. 2, pitching his body forward so that the first orientation sensor 22 senses a rotation of the torso around a horizontal axis. When the user pitches his body backward, a zoom out command may be given. Alternatively, the system may comprise a user-input comprising a physical zoom-in and zoom-out button on the HMD 20 or other equipment. The zoom in and zoom out commands may alternatively be initiated by the user pointing his view to a particular virtual zoom-in/zoom-out button which is displayed on the HMD 20, or by giving a voice command.

Figure 6:
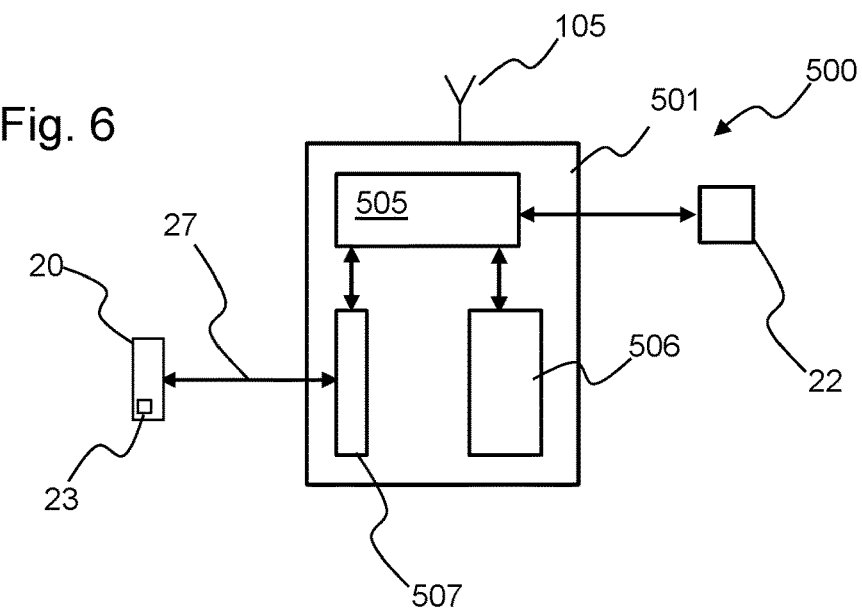
FIG. 6 schematically shows an embodiment of a virtual reality system according to an embodiment.

It is a further object of the invention to provide a virtual reality system in which a user can easily move a virtual space around without the use of a specific user interface, such as joystick, game controller or (virtual) keyboard. FIG. 6 schematically shows an embodiment of the virtual reality system 500. The virtual reality system 500 comprises a head mounted display device 20, a processing system 501 and a first orientation sensor 22.

The processing system 501 is arranged to display a 3D virtual world onto the head mounted display device 20. For that purpose, the processing system 501 may comprise a processor 505, a memory 506 and a display interface 507. The processing system 501 is arranged to receive orientation information from the orientation sensor 22, to select a point of view in the 3D virtual world depending on the received orientation information from the sensor 22. The processing system 501 will display the 3D virtual world as seen from the currently selected point of view onto the HMD 20, and, if the received orientation information changes, switch from the currently selected point of view to another newly selected point of view.

The processing system 501 of FIG. 6 may be a single computing device 501. The processing system 501 of FIG. 6 may be inside the HMD 20. The first orientation sensor 22 may be fixed to the torso of the user, as was explained with reference to FIG. 2. Similarly, a second orientation sensor 23 may be arranged in or on the HMD 20. The first orientation sensor 22 will then measure the orientation of the torso of the user 25 while the second orientation sensor 23 measures the orientation of the head of the user 25. The first orientation sensor 22 may be mounted on the computing device 501, but it is noted that the main orientation sensor 22 may be arranged somewhere else, as long as it is able to measure the direction of the torso of the user 25. The first orientation sensor 22 may for example be fixed to a swivel chair on which the user is sitting. The first orientation sensor 22 may alternatively be arranged in a necklace or belt worn by the user 25.

The processing system 501 may be arranged to define a trajectory in the 3D virtual world and to move the point of view along the trajectory when the user rotates its torso with reference to the fixed world. As was explained with reference to the embodiments of FIG. 1-4, the user is able to rotate the virtual world along the trajectory by simply rotating his body. This embodiment would, for example, allow convenient training of maintenance personnel of a large machine. The large machine can be computer generated and instead of the user walking, so as to look around it in virtual reality, he simply turns his swivel chair. The user does not need to walk which is a commonly known problem in such VR applications because of the risks of an accident or the limitations of the connection cables used.

Figure 7:
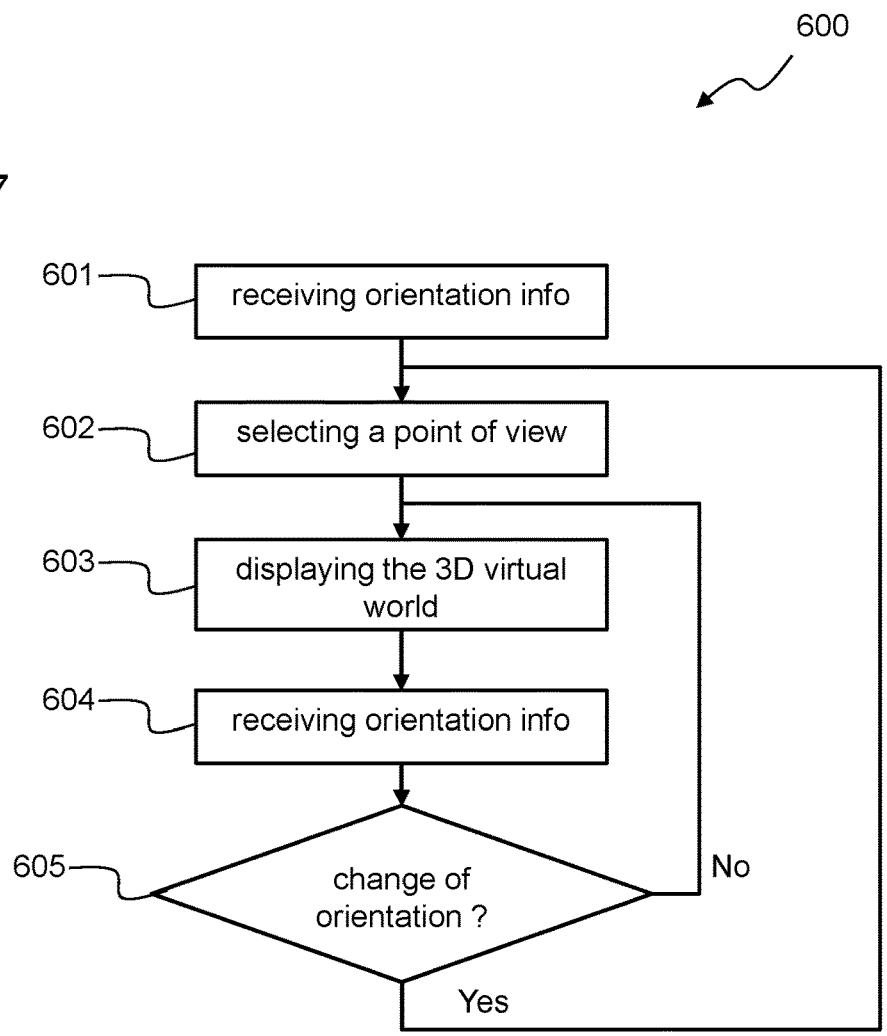
FIG. 7 shows a flow chart of a method of displaying a 3D virtual world on a head mounted display device according to an embodiment.

FIG. 7 shows a flow chart of a method 600 of displaying a 3D virtual world on a head mounted display device according to an embodiment. The method 600 comprises receiving 601 orientation information from the first orientation sensor 22. The method 600 also comprises selecting 602 a point of view. The selection of the point of view depends on the received orientation information. In an operation 603, the method comprises displaying the 3D virtual world as seen from the currently selected point of view onto the head mounted display device. If the second orientation sensor 23 is present, it can be used to change the viewing direction, so that the user can look around by turning his head. Then, in an operation 604, orientation information is received once more. A test 605 represents a check to detect if the received orientation information has changed. If the result is YES, the method returns to operation 602 to select another point of view, depending on the newly received orientation information. If the result of test 605 is NO, the method returns to operation 603, to display the 3D virtual world.

It should be noted that the above-mentioned embodiments illustrate rather than limit the invention, and that those skilled in the art will be able to design many alternative embodiments. Instead of live streaming content, recorded 3D video or recorded 3D still images may be used. Furthermore computer generated environments and objects may be mixed with live streaming content.

The processing system 101,102 may be embodied as, or in, a device or apparatus, such as a server, workstation, imaging apparatus or mobile device. The device or apparatus may comprise one or more microprocessors or computer processors which execute appropriate software. The processor of the system may be embodied by one or more of these processors. The software may have been downloaded and/or stored in a corresponding memory, e.g., a volatile memory such as RAM or a non-volatile memory such as Flash. The software may comprise instructions configuring the one or more processors to perform the functions described with reference to the processor of the system. Alternatively, the functional units of the system, e.g., the display interface and the processor, may be implemented in the device or apparatus in the form of programmable logic, e.g., as a Field-Programmable Gate Array (FPGA). In general, each functional unit of the system may be implemented in the form of a circuit. It is noted that the processing system 101,102 may also be implemented in a distributed manner, e.g., involving different devices or apparatuses. For example, the distribution may be in accordance with a client-server model, e.g., using a server and a thin-client PACS workstation.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A telepresence system for viewing a remote location in a manner that mimics natural movement of viewing the remote location as if a user were physically present at the remote location; the telepresence system comprising:
   a plurality of cameras;
   a head mounted display device;
   a processing system; and
   a first orientation sensor for measuring orientations of a body of the user;
   wherein each camera selected from the plurality of the cameras is positioned at a different viewpoint that is aligned such that fields of view of any two adjacent cameras selected from the plurality of cameras at least partly overlap with each other;
   wherein the processing system:
      receives image data from each one of the plurality of cameras;
      receives orientation information from the first orientation sensor;

selects one or two cameras from the plurality of cameras, the selection of the one or two cameras depending on the orientation information received, wherein the one or two cameras are denoted as, currently selected cameras;

sends image data received from the currently selected cameras to the head mounted display device for display in the head mounted display device;

if newly received orientation information indicates an orientation change across a predetermined threshold, switches from the currently selected cameras to one or two newly selected cameras from the plurality of cameras located at other viewpoints, wherein the one or two newly selected cameras are denoted as newly selected cameras; and sends image data from the newly selected cameras to the head mounted display device for display in the head mounted display device;

wherein additional orientation changes as indicated by further received orientation information causes further switching to adjacent cameras selected from the plurality of cameras such that content displayed in the head mounted display device showing the additional orientation changes is displayed in a continuous manner from the adjacent cameras selected from the plurality of cameras, which is consistent with mimicking natural movement of viewing the remote location as if the user were physically present at the remote location;

wherein a specific rotation orientation as determined by the first orientation sensor always selects a same camera or cameras from the plurality of cameras, which is consistent with mimicking natural movement of viewing the remote location as if the user were physically present at the remote location;

wherein the switch from the currently selected cameras to the newly selected cameras does not utilize a graphical user interface nor a joystick, which is consistent with mimicking natural movement of viewing the remote location as if the user were physically present at the remote location.

2. The telepresence system according to claim 1, wherein the first orientation sensor is separate from the head mounted display device.

3. The telepresence system according to claim 2, wherein the first orientation sensor is arranged in a wearable device not being the head mounted display device.

4. The telepresence system according to claim 1, wherein the plurality of cameras are substantially arranged in a horizontal plane and wherein the processing system is arranged to detect a rotation of the first orientation sensor around a y-axis perpendicular to the horizontal plane, and when, as seen from above, a clockwise rotation of the first orientation sensor is detected, the processing system will switch to the newly selected cameras, the newly selected cameras being located, when facing the field of view of the currently selected cameras to a right of the currently selected cameras; a counter clockwise rotation of the first orientation sensor is detected, as seen from above, the processing system will switch to the newly selected cameras, the newly selected cameras being located, when facing the field of view of the currently selected cameras to a left of the currently selected cameras.

5. The telepresence system according to claim 1, wherein the adjacent cameras selected from the plurality of cameras have parallel or converging optical axes.

6. The telepresence system according to claim 1, wherein the plurality of cameras are arranged in an array following a curved or angular trajectory.

7. The telepresence system according to claim 6, wherein the curved or angular trajectory is a closed loop, wherein the fields of view of the plurality of cameras are directed inward.

8. The telepresence system according to claim 1, wherein the plurality of cameras is arranged in at least two arrays each array following a curved or angular trajectory.

9. The telepresence system according to claim 8, wherein the plurality of cameras is substantially arranged on an imaginary sphere.

10. The telepresence system according to claim 1, wherein the processing system is arranged to send image data received from the two adjacent cameras selected from the plurality of cameras to the head mounted display device, wherein image data received from a first of the two adjacent cameras is displayed on a first display or first display part of the head mounted display device, and image data received from a second of the two adjacent camera is displayed on a second display or second display part of the head mounted display device.

11. The telepresence system according to claim 10, wherein the processing system is arranged to receive a zoom in command, and on receiving the zoom in command to switch from the currently selected cameras to two newly selected cameras selected from the plurality of cameras that are further removed from a perpendicular line bisecting both of the currently selected cameras and the two newly selected cameras.

12. The telepresence system according to claim 11, wherein the processing system is arranged to detect a rotation of the first orientation sensor around a horizontal axis, and interpret a detected rotation as the zoom in command or a zoom out command.

13. The telepresence system according to claim 1, further comprising a second orientation sensor arranged on a head of the user or attached with the head mounted display device, wherein the processing system is arranged to select a part of the field of view of the currently selected cameras, depending on orientation information received from the second orientation sensor.

14. The telepresence system according to claim 1, wherein a distance between the two adjacent cameras selected from the plurality of cameras is at least one meter.

15. A method of image processing, for viewing a remote location in a manner that mimics natural movement of viewing the remote location as if a user were physically present at the remote location; the method comprising:

receiving image data from each one of a plurality of cameras, wherein the plurality of cameras are positioned at different viewpoints that are aligned so that fields of view of any two adjacent cameras selected from the plurality of cameras at least partly overlap with each other;

receiving orientation information from a first orientation sensor;

selecting one or two cameras from the plurality of cameras, the selection of the one or two cameras depending on the received orientation information, wherein the one or two cameras are denoted as, currently selected cameras;

sending image data received from the currently selected cameras to a head mounted display device;

if the received orientation information changes, switching from the currently selected cameras to one or two newly selected cameras from the plurality of cameras, wherein the one or two newly selected cameras from the plurality of cameras are denoted as newly selected cameras; and sending image data received from the newly selected cameras to the head mounted display device;

wherein additional orientation changes as indicated by further received orientation information causes further switching to adjacent cameras selected from the plurality of cameras such that content displayed in the head mounted display device showing the additional orientation changes is displayed in a continuous manner from the adjacent cameras selected from the plurality of cameras, which is consistent with mimicking natural movement of viewing the remote location as if the user were physically present at the remote location;

always selecting a same camera or cameras from the plurality of cameras based on a specific rotation orientation as determined by the first orientation sensor, which is consistent with mimicking natural movement of viewing the remote location as if the user were physically present at the remote location;

wherein the switching from the currently selected cameras to the newly selected cameras does not utilize a graphical user interface nor a joystick, which is consistent with mimicking natural movement of viewing the remote location as if the user were physically present at the remote location.

16. A virtual reality system for viewing portions of a three dimensional virtual world in a manner that mimics natural movement as if a user were physically present in the three dimensional virtual world; the virtual reality system comprising:

a plurality of viewpoints of the three dimensional virtual world, a head mounted display device;

a processing system; and a first orientation sensor for measuring orientations of a body of the user;

wherein the plurality of viewpoints are aligned so that fields of view of any two adjacent viewpoints selected from the plurality of viewpoints at least partly overlap with each other;

wherein the processing system is arranged to:
  receive orientation information from the first orientation sensor;
  select a viewpoint from the plurality of viewpoints of the three dimensional virtual world, the selection of the viewpoint depending on the orientation information received, wherein this viewpoint is denoted as, currently selected viewpoint;
  display of a portion of the three dimensional virtual world as seen from the currently selected viewpoint onto the head mounted display device;
  if the received orientation information changes, switch from the currently selected viewpoint to another newly selected viewpoint from the plurality of viewpoints; and
  display of another portion of the three dimensional virtual world as seen from the newly selected viewpoint from the plurality of viewpoints onto the head mounted display device;

wherein additional orientation changes as indicated by further received orientation information causes further switching to adjacent viewpoints selected from the plurality of viewpoints such that content displayed in the head mounted display device showing the additional orientation changes is displayed in a continuous manner from the adjacent viewpoints selected from the plurality of viewpoints, which is consistent with mimicking natural movement of viewing the three dimensional virtual world as if the user were physically present in the three dimensional virtual world;

wherein a specific rotation orientation as determined by the first orientation sensor always selects a same viewpoint from the plurality of viewpoints, which is consistent with mimicking natural movement of viewing the three dimensional virtual world as if the user were physically present in the three dimensional virtual world;

wherein the switch from the currently selected viewpoint to the newly selected viewpoint does not utilize a graphical user interface nor a joystick, which is consistent with mimicking natural movement of viewing the three dimensional virtual world as if the user were physically present in the three dimensional virtual world.

17. The virtual reality system according to claim 16, wherein the first orientation sensor is separate from the head mounted display device.

18. The virtual reality system according to claim 17, further comprising a second orientation sensor generating second orientation information arranged on a head of the user or attached with the head mounted display device, wherein the processing system is arranged to determine a viewing angle from the currently selected viewpoint based on the second orientation information of the second orientation sensor.

19. The virtual reality system according to claim 18, wherein the processing system is arranged to move a point of view from the plurality of viewpoints to a right if a clockwise rotation of the first orientation sensor, as seen from above, is detected; and move the point of view to a left if a counter clockwise rotation of the first orientation sensor is detected, as seen from above.

20. The virtual reality system according to claim 17, wherein the processing system is arranged to receive a zoom in command, and on receiving the zoom in command to move a point of view from the plurality of viewpoints through the three dimensional virtual world in a direction that a torso of the user is facing as determined by the first orientation sensor.

21. The virtual reality system according to claim 20, wherein the processing system is arranged to detect a rotation of the first orientation sensor around a horizontal axis, and interpret a detected rotation as the zoom in command or a zoom out command.

22. The virtual reality system according to claim 16, wherein the processing system is arranged to move a point of view from the plurality of viewpoints through the three dimensional virtual world in a continuous manner depending on a change in the received orientation information of the first orientation sensor.

23. A method of displaying portions of a three dimensional virtual world on a head mounted display device in a manner that mimics natural movement as if a user were physically present in the three dimensional world; the method comprising:

rendering left eye and right eye images of the three dimensional virtual world as seen from a plurality of viewpoints of the three dimensional virtual world, wherein the plurality of viewpoints are aligned so that fields of view of any two adjacent viewpoints selected from the plurality of viewpoints at least partly overlaps with each other;

receiving orientation information from a first orientation sensor;

selecting a viewpoint from the plurality of viewpoints of the three dimensional virtual world, the selection of the viewpoint depending on the received orientation information, wherein the viewpoint is denoted as, currently selected viewpoint;

displaying a portion of the three dimensional virtual world as seen from the currently selected viewpoint onto the head mounted display device;

if the received orientation information changes, switching from the currently selected viewpoint to another newly selected viewpoint from the plurality of viewpoints; and displaying another portion of the three dimensional virtual world as seen from the newly selected viewpoint onto the head mounted display device;

wherein additional orientation changes as indicated by further received orientation information causes further switching to adjacent viewpoints selected from the plurality of viewpoints such that content displayed in the head mounted display device showing the additional orientation changes is displayed in a continuous manner from the adjacent viewpoints selected from the plurality of viewpoints, which is consistent with mimicking natural movement of viewing the three dimensional virtual world as if the user were physically present in the three dimensional virtual world;

always selecting a same viewpoint from the plurality of viewpoints based on a specific rotation orientation as determined by the first orientation sensor, which is consistent with mimicking natural movement of viewing the three dimensional virtual world as if the user were physically present in the three dimensional virtual world;

wherein the switching from the currently selected viewpoint to the newly selected viewpoint does not utilize a graphical user interface nor a joystick, which is consistent with mimicking natural movement of viewing the three dimensional virtual world as if the user were physically present in the three dimensional virtual world.

\* \* \* \* \*